United States Patent [19]

Hörzer et al.

[11] 4,199,066

[45] Apr. 22, 1980

[54] EQUIPMENT FOR REMOVING THE RESIDUAL BARK IN DECORTICATING FACILITIES

[76] Inventors: Gustav Hörzer; Johann Mörth, both of Graz, Austria; Maschinenfabrik Andritz Aktiengesellschaft, 03, Austria

[21] Appl. No.: 903,924

[22] Filed: May 8, 1978

[30] Foreign Application Priority Data

May 10, 1977 [AT] Austria ............................... 3343/77

[51] Int. Cl.² .............................................. B07C 5/04
[52] U.S. Cl. .................................. 209/626; 209/663; 209/672
[58] Field of Search ............... 209/625, 626, 627, 667, 209/672, 663

[56] References Cited

U.S. PATENT DOCUMENTS

| | | | |
|---|---|---|---|
| 2,257,352 | 9/1941 | Silver | 209/672 |
| 2,551,129 | 5/1951 | Hulfish et al. | 19/33 X |
| 3,451,084 | 6/1969 | Silver | 209/667 X |
| 3,475,791 | 11/1969 | Brewster et al. | 19/305 X |
| 4,101,420 | 7/1978 | Luginbühl | 209/672 |

*Primary Examiner*—Joseph J. Rolla
*Attorney, Agent, or Firm*—James E. Bryan

[57] ABSTRACT

This invention relates to an improvement in equipment for separating the residual bark in decorticating facilities, for which, following decortication, the material is moved from the decorticating drum into a collecting funnel or hopper and from there moved on by a conveyor system, where the conveyor system is in the form of a first conveyor belt and is mounted transversely to the lower part of the hopper extending across the end of the drum, the improvement comprising joining one reversing location of the first conveyor belt by another reversing location of a second conveyor belt with an intermediate space between them, an additional roller corresponding in width to the width of the belts mounted between them, and one rectilinear guide member at each end of the additional roller to permit displacement thereof.

6 Claims, 4 Drawing Figures

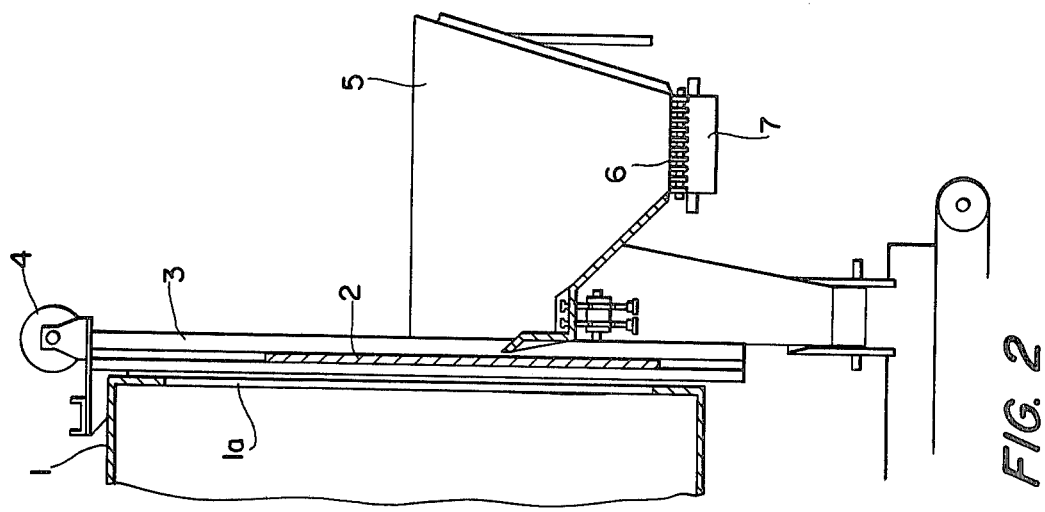
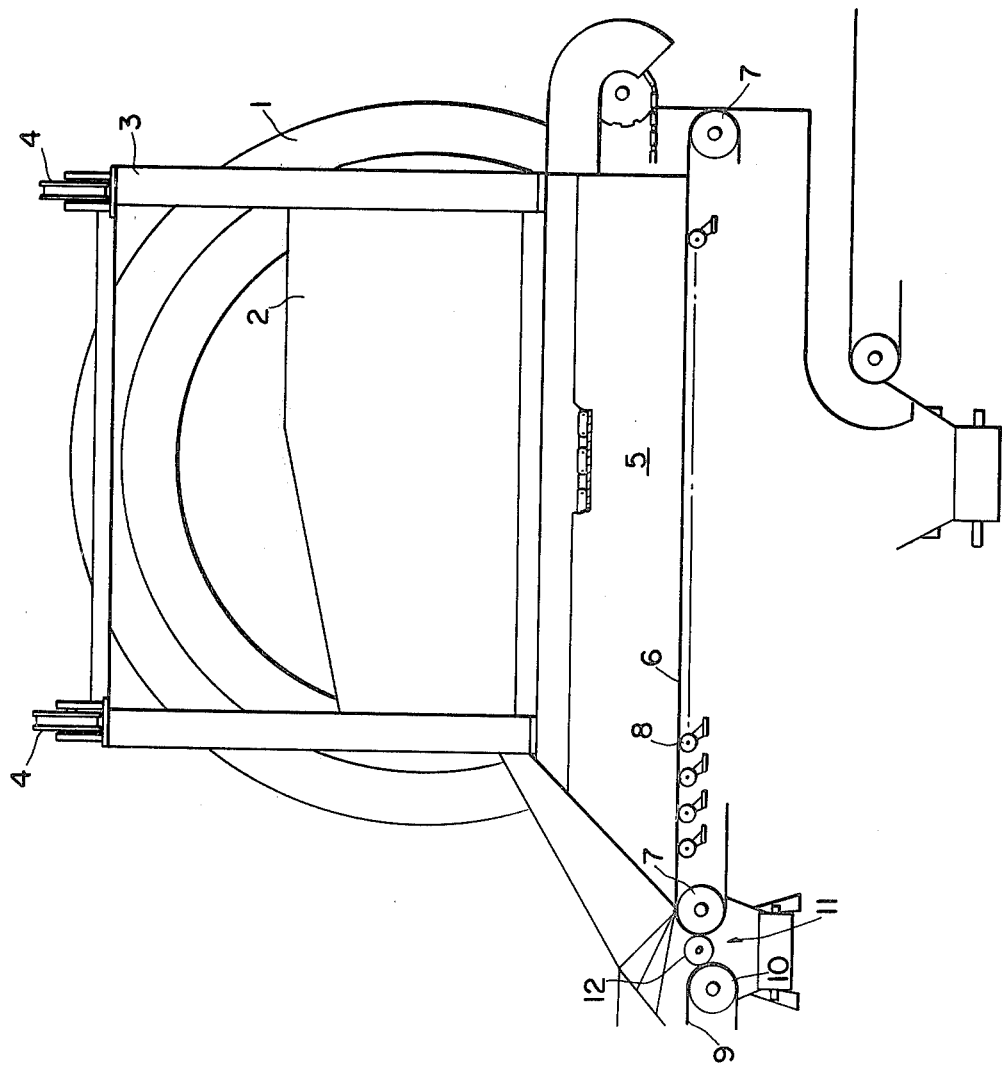
FIG. 2
FIG. 1

EQUIPMENT FOR REMOVING THE RESIDUAL BARK IN DECORTICATING FACILITIES

The invention relates to equipment for removing the residual bark in decorticating facilities, in which equipment, following decortication, the material is moved out of the decortication drum and into a collecting funnel or hopper and transferred by a conveyor system, where the conveyor system is in the form of a belt and is mounted transversely at the lower part of the hopper extending across the end of the drum.

The purpose of such an arrangement is to rid the material expelled from the decortication drum of its residual bark without thereby losing valuable wood.

It is known to devise arrangements allowing the removal of the bark, preferably comprising sieves or similar devices, which receive the wood from above. A special vibrating system ensures that the bark, which is smaller, passes through the meshes of the sieve and that the wood remains on the sieve, the conveyor belt moving it for further treatment.

Again, it is known to provide separating equipment directly at the decorticating drum, the wood being retained within a certain range at the drum exit by additional grids, and the bark being removed in the lower part.

All of such equipment has the common drawback that it is difficult to separate the bark from the wood, especially when these components are comparable in size. It is inevitable therefore that wood particles will pass through the sieves, regardless of the sieves being stationary or vibrating. Therefore a certain percentage of the wood must be expected to be lost and eliminated as waste.

The invention addresses the problem of providing equipment for separating the residual bark in decortication facilities, in which equipment, following decortication, the material is moved from the decorticating drum into a hopper and is moved further by means of a conveyor system, where the conveyor system is in the form of a belt and mounted transversely at the lower part of the hopper and extending across the end of the drum. In this equipment, the residual bark of the part already pre-sifted in the decorticating drum is eliminated with wood particles of the same size. This goal is achieved in accordance with the invention by providing an intermediate space between one reversing location of the conveyor belt linked to another of a further belt, and mounting an additional roller corresponding to the width of the belts in the intermediate space which is driven either by friction from the belts or by a separate drive so as to rotate. A rectilinear guide is provided at each end of the roller to permit a translational adjustment. A further embodiment of the invention provides that the bearings mounted to the ends of the roller rest in a sliding block, so as to permit an upward displacement at the rectilinear guides.

Such an arrangement allows effective separation between the wood particles and the residual bark due to the roller mounted between the reversing points of the belts conveying the wood particles at the level of the belt and dropping the smaller residual bark.

The invention is explained below in further detail in relation to an embodiment.

FIG. 1 is a view in elevation of the decorticating drum together with the assembled conveyor belt;

FIG. 2 is a view in cross-section of the hopper;

Figure 3:
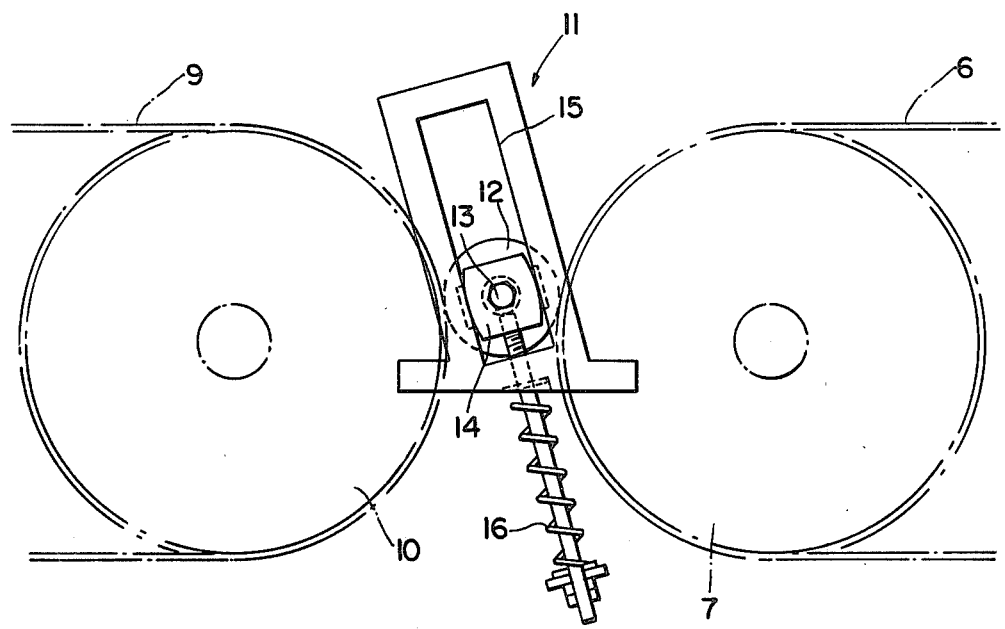
FIG. 3 is a view in elevation of the roller with a rectilinear guide.

As shown by FIG. 1, the rear part of drum 1 is closed by a slider 2. The slider 2 is guided within a frame 3 which can be moved up and down by means of the rollers 4 and tackles (not shown).

A hopper 5 is connected at the bottom at this end of the drum 1. A conveyor belt 6 is mounted at the bottom of the hopper 5 which extends transversely across the drum 1. The conveyor belt 6 is provided with two reversing rollers 7 and a set of supporting rollers 8. A further conveyor belt 9 is mounted some distance from the conveyor belt 6, the belt 9 also being provided with reversing roller 10. The two reversing rollers 7 and 10 however are not directly contiguous, rather a space 11 remains between them. This intermediate space 11 is occupied by a somewhat smaller roller 12 and thus bridges the conveyor belts 6 and 9. Advantageously, the conveyor belt 9 with its reversing roller 10 will be mounted somewhat lower, although in principle horizontal conveyance is quite feasible.

FIG. 2 shows a longitudial section of a part of the drum 1, comprising an opening 1a at its rear end. As already mentioned, this opening 1a is closed by the slider 2 which can move up and down in the frame 3. The hopper 5 is mounted to connect with the drum 1 at approximately its center line. At its lower end is the conveyor belt 6. FIG. 2 serves merely to better illustrate the hopper and the position of the conveyor belt 6.

FIG. 3 shows on an enlarged scale the reversing rollers 7 and 10, the belts 6 and 9 passing around them simultaneously acting as drives for the roller 12 located in the intermediate space 11. It is furthermore possible to set the roller 12 into motion by means other than frictional, for instance by an extraneous drive. What is essential is that the roller 12 rotate more rapidly than the conveyor belt 6 and that furthermore it be located above the center of the axes, so that when the roller is depressed into the lowermost position, it cannot fall between and through the conveyor belts. The roller 12 is provided at each of its ends with a bearing 13 which in turn rests in a slide block 14. This slide block 14 is seated in a rectilinear guide 15 and is biased downwardly by a tension spring 16. The rectilinear guide 15 extends from about the center line of the reversing roller 7 upwardly and subtends an angle between the vertical and the direction of conveyance from 10° to 20°, and preferably 15°. The slide block 14 is convex on its guided faces to prevent denting.

When the wood together with the residual bark still being carried along in loose form is moved by the reversing roller 7 toward the roller 12, then this wood cannot escape through the intermediate space 11 to the bottom because it is thrown from the roller 12, which has the greater peripheral speed, onto the conveyor belt 9. The residual bark on the other hand is small enough and drops through the intermediate space 11, that is, between conveyor belt 6 and the roller 12, to the bottom. If a larger piece of wood were to jam between the roller 12 and the conveyor belt, the roller is capable of unilaterally yielding upwardly. The adjustment pressure then becomes less and the wood is again flung upwardly. The residual bark usually is like saw dust and drops through the intermediate space.

Figure 4:
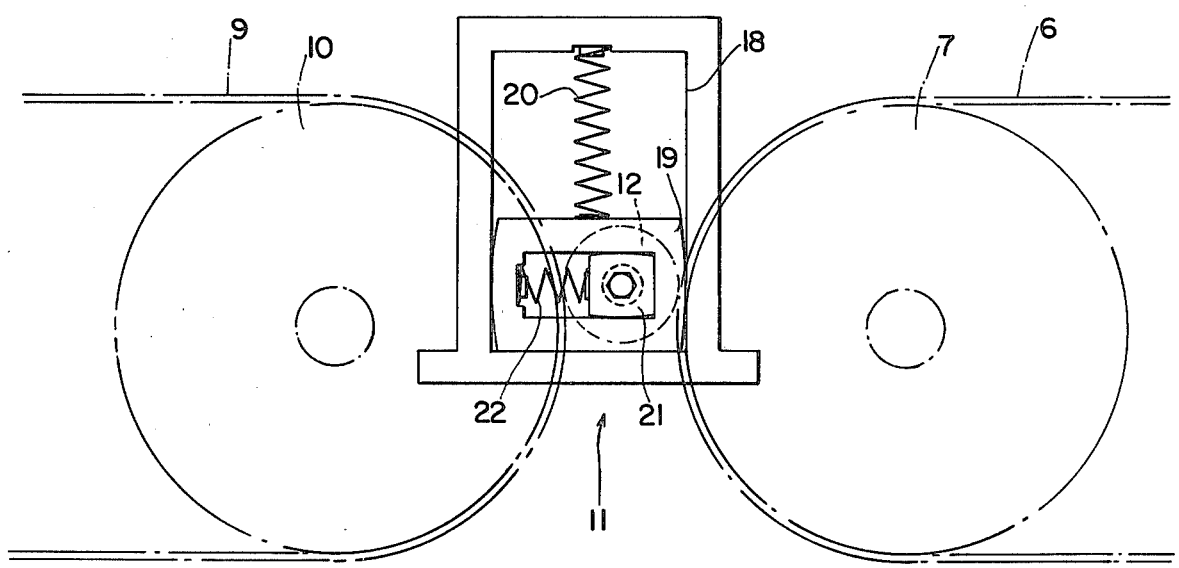
FIG. 4 is a further embodiment of the rectilinear guide.

FIG. 4 shows another variation, in which a rectilinear guide 18 is provided in the intermediate space 11 between the reversing rollers 7 and 10, the rectilinear guide now having a vertical position. The slide block 19 is somewhat larger than for the construction of FIG. 3 and is maintained in its lower position by a compression spring 20. Again the contact surface of the slide block 19 in the rectilinear guide is convex to prevent denting. The slide block 19 includes another slide block 21 inside of it which can be displaced horizontally. Another compression spring 22 keeps slide block 21 in its initial position.

As before, the roller 12 is pushed out of its position when larger pieces of wood arrive, the deviation being upwardly or sideways or a combination of these. Again it is possible that this displacement takes place unilaterally, so that the roller 12 may perform a rocking motion when in operation.

This arrangement therefore achieves separating in simple manner the more minute residual bark from the wood on the conveyor belt. This equipment especially offers the advantage that even long-fiber bark may be easily removed because of easy tightening between the roller and the conveyor belt and resulting movement to the bottom.

It will be obvious to those skilled in the art that many modifications may be made within the scope of the present invention without departing from the spirit thereof, and the invention includes all such modifications.

What is claimed is:

1. In equipment for separating the residual bark in decorticating facilities, for which, following decortication, the material is moved from the decorticating drum into a collecting funnel or hopper and from there moved on by conveyor system, where the conveyor system is in the form of a first conveyor belt and is mounted transversely to the lower part of the hopper extending across the end of the drum, the improvement comprising joining one reversing location of the first conveyor belt by another reversing location of a second conveyor belt with an intermediate space between them, an additional roller corresponding in width to the width of the belts mounted between them, and one rectilinear guide means at each end of the additional roller to permit displacement thereof.

2. Equipment according to claim 1 including bearings mounted at the ends of the roller resting in a slide block permitting an upward displacement in the rectilinear guide means.

3. Equipment according to claim 1 in which the rectilinear guide means is slanted between 10° and 20°, in the direction of material conveyance, and including tension spring means biasing a sliding block in said rectilinear guide means downwardly.

4. Equipment according to claim 1 in which the additional roller is rotated by the friction of the conveyor belts.

5. Equipment according to claim 1 in which the additional roller is rotated by an extraneous drive means.

6. Equipment according to claim 1 in which the rectilinear guide means is vertically mounted, and including compression spring means biasing a first slide block in said guide means downwardly, a second slide block in said first slide block, and compression spring means biasing said second slide block horizontally towards said first conveyor belt.

* * * * *